United States Patent [19]

Walla

[11] Patent Number: 5,419,569

[45] Date of Patent: May 30, 1995

[54] FIRE FIGHTERS HAND TRUCK

[76] Inventor: Robert J. Walla, 8212 Mark Ave., Sherwood, Ark. 72116

[21] Appl. No.: 74,371

[22] Filed: Jun. 11, 1993

[51] Int. Cl.⁶ .............................................. B62B 1/06
[52] U.S. Cl. ................... 280/47.27; 280/5.22; 280/47.28; 280/79.6
[58] Field of Search ............... 280/5.22, 47.2, 47.24, 280/47.27, 79.6, 47.28, 47.131, 79.5, 47.29

[56] References Cited

U.S. PATENT DOCUMENTS

| | | | |
|---|---|---|---|
| 2,820,643 | 1/1958 | Cohn | 280/47.27 X |
| 2,838,190 | 6/1958 | Stevens | 280/47.27 X |
| 3,214,043 | 10/1965 | Duncan | 280/47.27 X |
| 3,893,687 | 7/1975 | Victor | 280/47.27 |
| 4,046,391 | 9/1977 | Restad et al. | 280/47.27 X |

Primary Examiner—Margaret A. Focarino
Assistant Examiner—Michael Mar
Attorney, Agent, or Firm—Stephen D. Carver; Trent C. Keisling

[57] ABSTRACT

A hand truck for fire fighting stores and transports SCBA air bottles. The highly stable hand truck is designed for efficient manipulation by one or two firefighters. It readily traverses obstructed areas, inclined stair cases and the like. The frame comprises a pair of rigid, spaced apart side rails extending between a lower, load-supporting toe-plate and an upper handle. Vertically spaced apart cross bars reinforce the frame. Dolly wheels are mounted adjacent stair climbers, thus enabling passage of the hand truck up and down stairways, over curbs and fire hoses and other obstacles. A container stores accessories. A retractable support system stabilizes the hand truck and enables it to assume an inclined, horizontal orientation for loading and unloading. Frame rail runways with outer rubber liners frictionally contact the air bottles. Bottles are confined within a transportation zone of generally triangular dimensions. The bottom of the zone is formed by the runways and the "base" of the triangular zone is formed by the toe plate. A resilient quick-release ratchet and strap system that secures the bottles forms the hypotenuse of the triangular zone. A transverse anchor strap, comprising an automobile seat belt and buckle assembly, is mechanically secured to the toe plate and extends between terminal loops in both support straps. Preferably the anchor strap is captivated within spaced-apart notches defined in opposite sides of the toe plate. A recessed storage volume defined between the runways and the frame cross bars for storing hand tools.

19 Claims, 5 Drawing Sheets

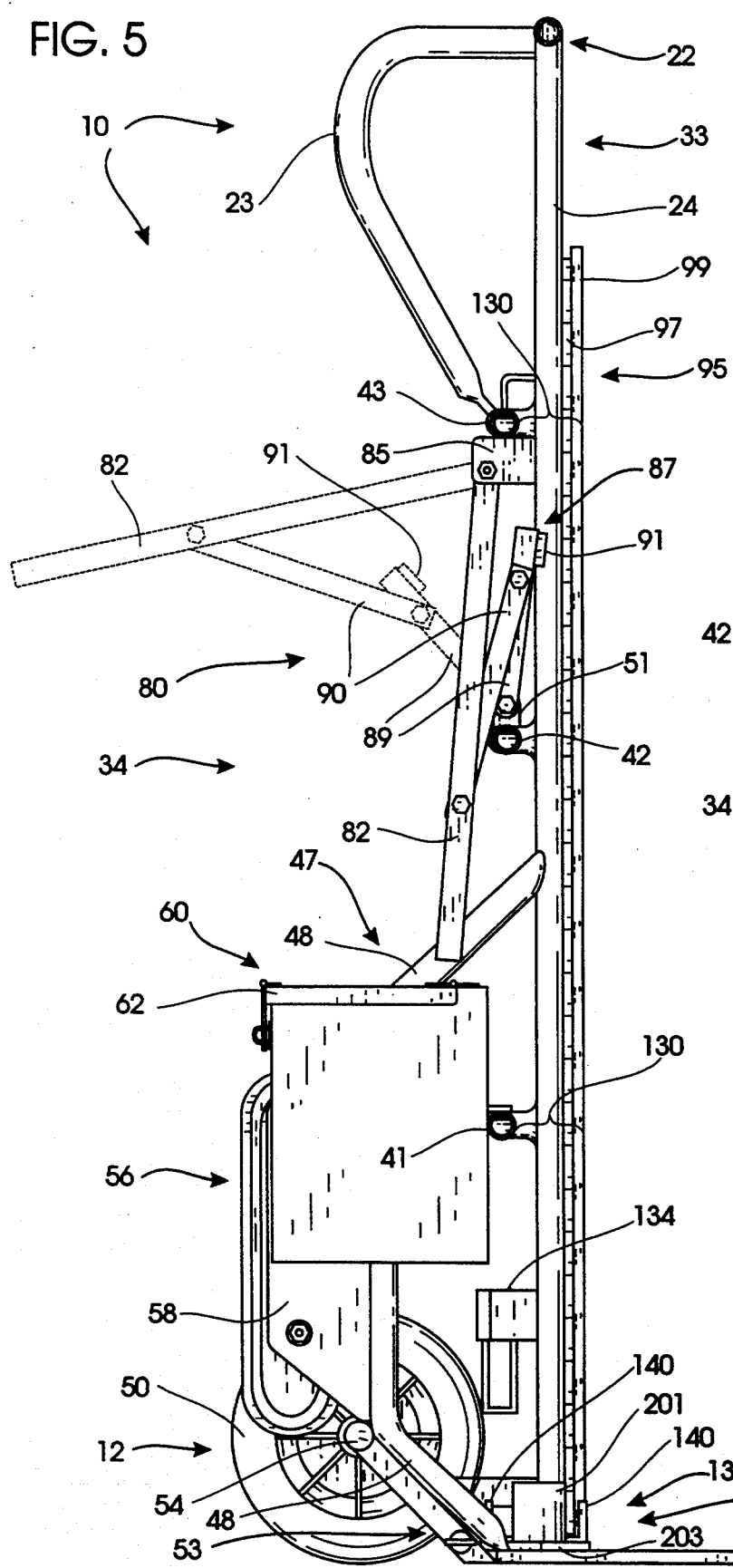
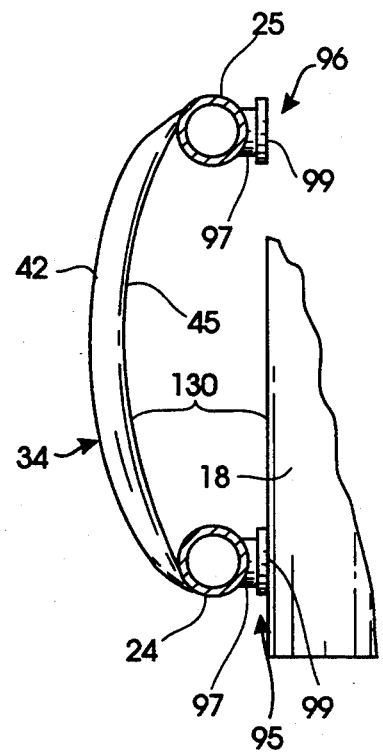
FIG. 5
FIG. 6

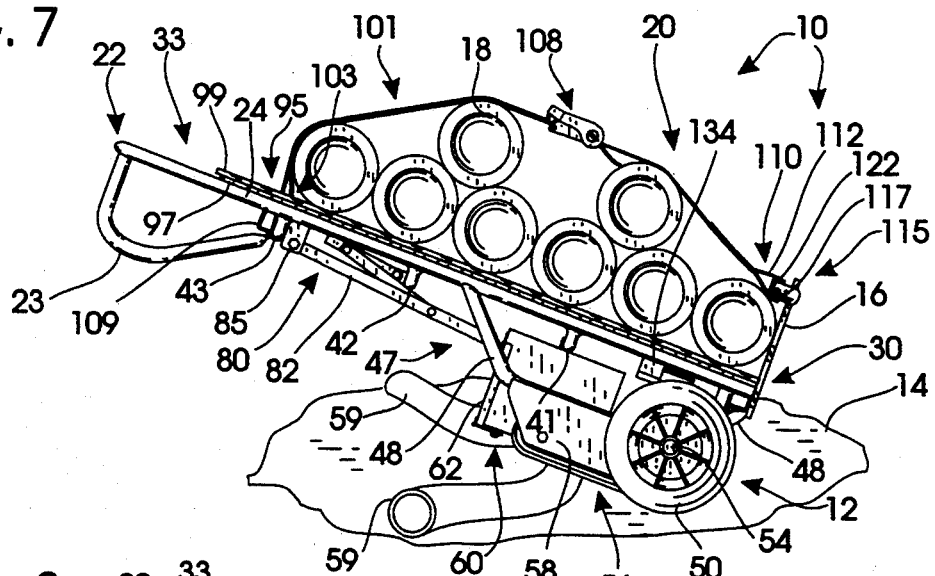
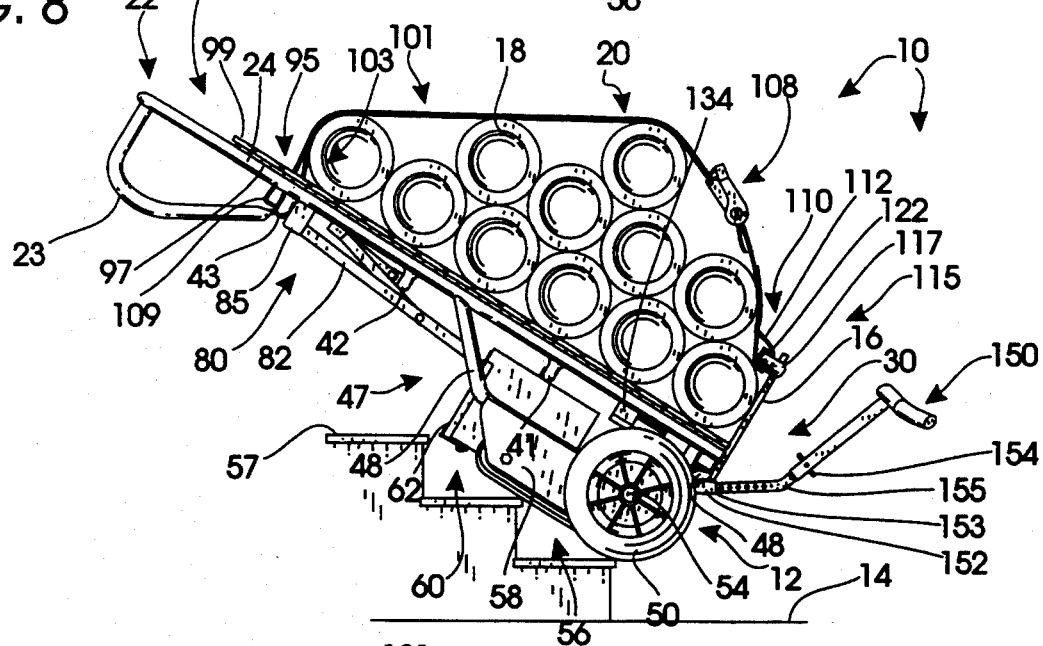
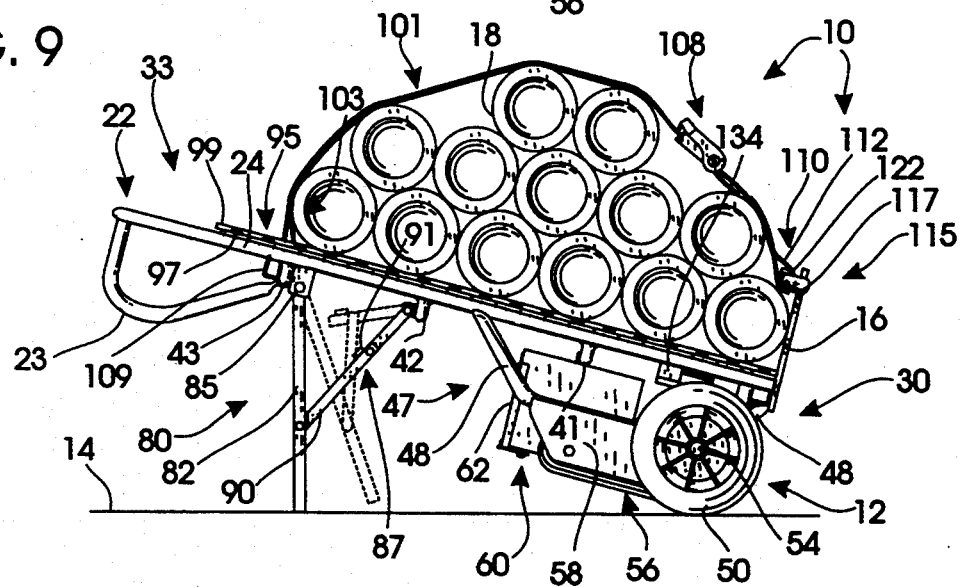

FIRE FIGHTERS HAND TRUCK

BACKGROUND OF THE INVENTION

1. Field of the Invention

The present invention relates generally to hand trucks or dollys adapted to transport a variety of materials. More particularly, my invention relates to hand trucks specifically constructed for fire fighting. The field of the invention includes numerous sub classes within United States Patent Classes 280 and 414.

2. Description of the Prior Art

Numerous prior art hand trucks are known in the prior art. While hand trucks have been employed in fire-fighting, I am aware of no prior art hand truck specifically designed for fire fighting.

Modern fire fighting regulations mandate the use of self-contained breathing apparatus (i.e., SCBA equipment), especially when involving structural entry. In general SCBA apparatus is required for fire fighting where the atmosphere is hazardous or it is expected to be hazardous. When so-equipped, the firefighter can breathe safely even when exposed to noxious fumes and the intense heat. Numerous standards exist regulating the type of SCBA apparatus employed in modern fire fighting. Standards regulating Fire Department use of SCBA air cylinders include the National Fire Protection Association (NFPA) Standard 1500 and NFPA Standard 1404.

Typical SCBA air bottles vary in size. Thirty minute bottles for self contained breathing apparatus charged at approximately 2216 PSI are approximately six inches in diameter and two feet in length. They can weigh fourteen to twenty pounds when fully charged. A larger diameter one hour bottle is over seven inches in diameter and two feet in length. Thus, when a dozen or more bottles are to be transported, a heavy, cumbersome load results.

Numerous SCBA air cylinders are transported into the fire zone. Typically a hand cart or dolly is employed to enable one or two firemen to move the cylinders to the required area. Under typical fire fighting conditions of danger and duress, a number of the bottles may be haphazardly stacked together on the dolly for transport. They may be stacked in layers on conventional hand trucks, assuming a variety of configurations. It is usually difficult to properly arrange relatively heavy loads of air cylinders on conventional hand trucks. As a result, the load may shift when the hand trucks are moved or varied in configuration. For example, the load may shift when several layers of bottles are stacked together on a hand truck that is moved at an angle up a staircase. Load shifting and inadvertent dropping of bottles is particularly common where individual bottles are being removed from the load at different locations within the fire region.

Under the difficult conditions in which the devices are used, numerous other disadvantages have existed with the prior art hand trucks. For example, when the hand truck is heavily loaded with numerous fully-pressurized SCBA cylinders, it is obviously much heavier than when it is unloaded. Difficulties attendant with the moving of a fully loaded dolly up flights of stairs under emergency circumstances should not be underestimated. As a corollary, a hand truck should be adapted for two man operation when loaded, but it should be quickly deployable in the single-man mode when necessary. In general the regulations require that when firefighters employ SCBA cylinders, they must operate in teams of two or more to insure communication with each other. Individual firefighters must be able to readily offer emergency assistance to others on the team.

Since the air bottles are not the only item used in fire fighting, such a hand truck should conveniently store a variety of other tools. For example, forcible entry tools such as axes or pry-bars should be conveniently transportable by the hand truck. Sprinkler wedges, sprinkler tongs, latch straps, hose fittings and adapters should also be readily available for easy access by the fire fighter.

The prior art includes a variety of hand trucks, both patented and unpatented, which are adapted to move a variety of materials and objects.

Typical prior art hand trucks include and elongated rigid frame, with a lower shelf at the bottom, and a wheeled super structure. Stair crawler mechanisms are usually provided to enable the device to negotiate stairs, and such devices have been used in the past for hauling a variety of objects. As seen in the Harper Steel Industrial Hand Truck Catalog 190, pages 15–17, stair crawler hand trucks are known for moving heavy objects over difficult terrain and up stairs. Harper catalog W-9, pages 3–9 shows a variety of hand trucks adapted to carry pressurized gas cylinders. Known hand trucks specifically aimed at such cylinders usually maintain them vertically for stability.

Prior art patents relating generally to hand trucks include U.S. Pat. Des. No. 278,373, and utility U.S. Pat. No. 4,494,626. Rousseau U.S. Pat. No. 3,606,371 issued Sep. 20, 1971 shows a dolly for carrying drum-like devices stacked horizontally. U.S. Pat. No. 4,860,606 issued to Rousseau on Aug. 29, 1989, shows a carrying truck wherein vertically extending items can be rigidly secured together by a ratchet and strap system. Stair crawlers are well known as seen in the latter patent. Numerous patents such as U.S. Pat. No. 4,902,187, show hand trucks for carrying vertically oriented cylinders. Eaglin U.S. Pat. No. 4,899,968, shows a rotary system for handling gas cylinders. U.S. Pat. Nos. 4,281,957, and 4,194,866 also relate to hand trucks.

SUMMARY OF THE INVENTION

I have designed a new hand truck specifically for fire fighting purposes. My highly stable hand truck is designed for efficient manipulation by one or two firefighters. The hand truck readily traverses flat areas, obstructed areas, inclined stair cases and the like. My new hand truck is customized for transporting self-contained breathing apparatus (SCBA) air bottles. However, the truck includes a region for storing forcible entry tools such as an axe, a pry bar, and a sledge hammer.

My hand truck frame preferably comprises a pair of rigid, spaced apart side rails extending between a rigid lower toe-plate and an upper handle. Vertically spaced apart cross bars reinforce the frame. A sub-frame comprises a pair of rearwardly projecting tubes joined at their bottoms to the bottom of frame rails. Suitable dolly wheels are mounted to the subframe adjacent conventional stair climbing apparatus. The stair climbers facilitate passage of the hand truck up and down stairs, and over curbs, stairways, fire hoses and other obstacles. A storage container mounted rearwardly on the subframe stores fire fighting accessories.

A retractable support system stabilizes the hand truck and enables it to assume an inclined, horizontal orientation for loading and unloading. The support includes a pivoted leg and a locking link for locking the leg in a deployed position.

Multiple SCBA air bottles can be accommodated. They may be arranged in multiple layers disposed upon the frame. Each of the frame rails include runways having outer resilient rubber liners frictionally contacted by the air bottles when they are loaded. The liner prevents bottles from shifting or escaping. The toe plate projecting forwardly from the frame bottom supports the load in cooperation with the frame rails. Bottles are confined within a transportation zone of generally triangular dimensions. The bottom of the zone is formed by the runways and the "base" of the triangular zone is formed by the toe plate. A resilient, quick-release ratchet and strap system secures the bottles, and it forms the hypotenuse of the triangular zone.

The preferred strap system comprises twin support strap assemblies extending from the top of the frame towards the toe plate. Each strap assembly comprises an upper portion entrained about a frame cross member, a tightening ratchet, and a lower portion terminating in a loop at the frame bottom. A transverse anchor strap, preferably comprising a conventional automobile seat belt and buckle assembly, is mechanically secured to the toe plate. The anchor strap braces the support straps, extending between the terminal loops in both straps. Preferably the anchor strap is captivated within spaced-apart notches defined in opposite sides of the toe plate.

A recessed storage volume defined between the runways and the frame cross bars. Suitable brackets are preferably included for further bracing hand tools that may be stored within this region. Straps are provided for further restraining these tools within the hand cart. A secondary handle system optionally secured to the frame enables convenient manipulation by an additional fireman, so that a pair of fire fighters may conveniently move a heavy, fully loaded hand cart up and down stairs.

Thus a primary object of my invention is to provide a hand truck for safely and efficiently carrying SCBA air bottles.

Another object of the present invention is to provide a hand truck specifically designed for fire fighting.

Another object is to provide a fire fighter's hand truck that is highly stable when disposed either vertically, angularly, or horizontally.

A similar object of the present invention is to provide a fire fighter's hand truck of the character described which conveniently stores an axe, a sledge hammer, a pry bar, and other tools needed for structural entry fire fighting.

Yet another object of the present invention is to provide a quick release means for bracing the hand truck in a horizontal position.

A related object is to provide a hand truck of the character described which may be disposed in a stable upright position, a flat position on the ground, or an intermediate position tilted with respect to the ground by an adjustable foot.

Another object of the present invention is to provide a positive locking leg that helps orient the hand truck for conveniently racking or unloading the SCBA bottles.

A fundamental object is to provide a quick-release stabilizing system which resiliently supports air bottles in a stable position.

Another object of the present invention is to provide a strap system for a hand truck of the character described which can be quickly deployed or undeployed, but which maintains the air bottles in a compact, stable position during transportation.

A fundamental object is to provide a hand truck for fire fighters of the character described that can stably support several SCBA bottles in a plurality of layers.

A primary object of the present invention is to provide a hand truck which can be used by a single fire fighter and which quickly and efficiently maneuvers air bottles, hand tools and the like about a fire fighting environment.

A related object is to provide a hand truck of the character described which can easily and conveniently climb stairs or negotiate obstacles such as curbs, fire hoses and the like.

Another object is to provide a fire fighters hand truck which compactly stores a variety of fire fighting tools and accessories.

A still further object is to provide a fire fighters hand truck of the character described which can hold either thirty minute cylinders, forty-five minute cylinders, or one hour air cylinders.

Another object is to provide a hand truck of the character described with a quick-release that quickly converts the device for two-man operation.

A primary object is to provide a hand truck of the character described which can stably transport a plurality of horizontally disposed air cylinders.

Another important object of the present invention is to provide a hand truck system of the character described in which high pressure air bottles can be loaded and unloaded quickly, without rolling off or escaping.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views:

FIG. 5 is a fragmentary longitudinal sectional view showing the inner volume of the apparatus and tool mounting structures;

FIG. 6 is an enlarged fragmentary cross section taken generally along line 6—6 of FIG. 1, showing the inner volume;

FIG. 7 is a side elevational view of the present invention with a plurality of tanks deployed thereon and illustrating movement over a fire hose;

FIG. 8 is a side elevational view of the present invention with a plurality of tanks deployed thereon and illustrating movement up a stairway with the auxiliary handle deployed for two man operation; and, FIG. 9 is a side elevational view of the present invention with a plurality of tanks deployed thereon and illustrating deployment of the stand.

DETAILED DESCRIPTION OF THE DRAWINGS

Figure 1:
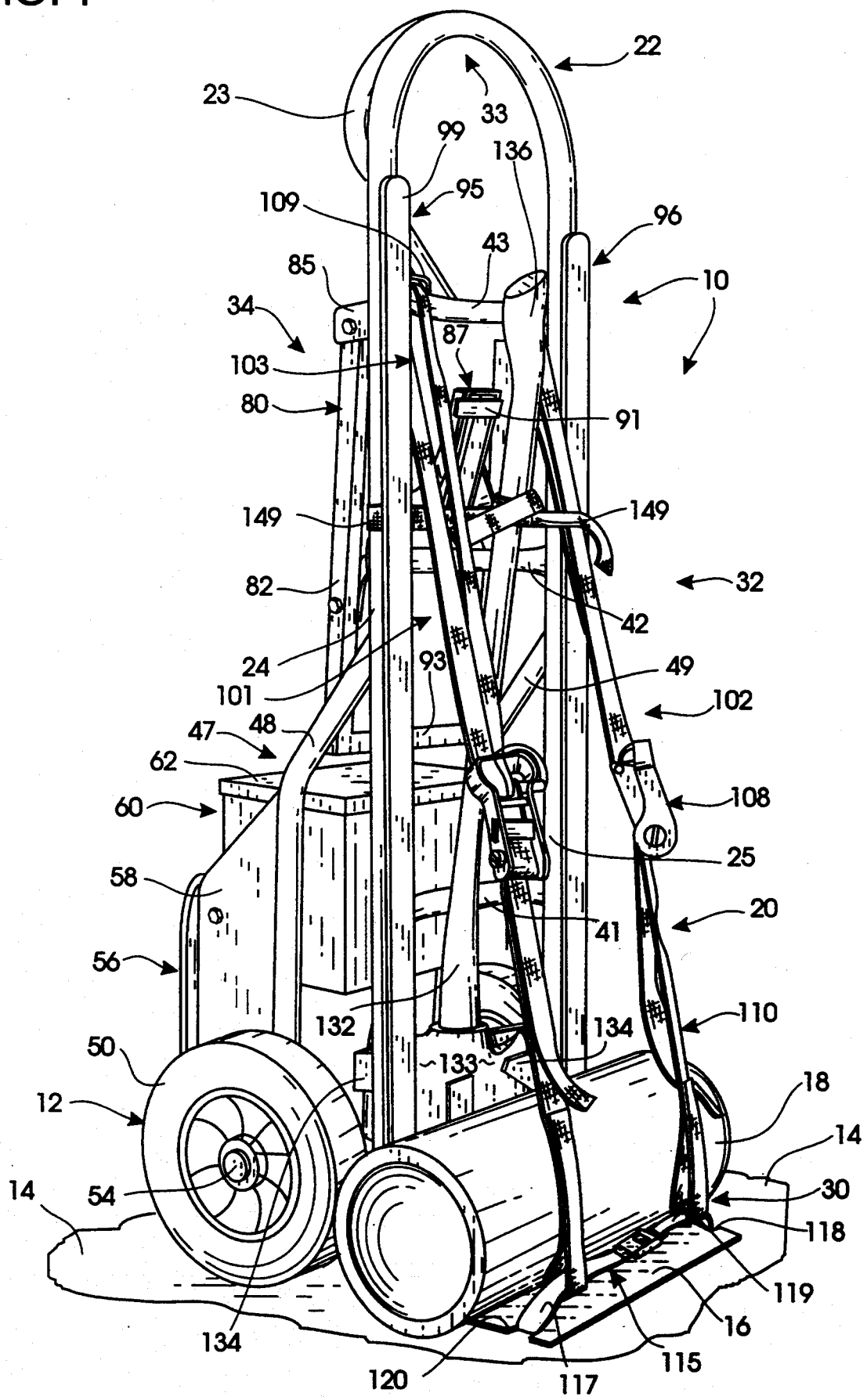
FIG. 1 is a front isometric view of my Fire Fighters Hand Truck.

With reference directed now to the accompanying drawings, my fire fighter's hand truck has been generally designated by the reference numeral 10. Hand truck 10 may be easily manipulated by one or two firefighters, and it readily traverses flat areas, obstructed areas, inclined stair cases and the like. Although the hand truck is primarily designed for carrying self-contained breathing apparatus (SCBA) bottles, it conveniently stores and transports a variety of other tools. It is highly stable when disposed either vertically, angularly, or horizontally.

In FIG. 1 hand truck 10 is disposed upon a supporting surface 14 in stable, vertically upright position by the combination of a wheel system 12 and a lower toe plate 16 to be hereinafter described. One or more SCBA air cylinders 18 are preferably stacked horizontally across the device as illustrated. A strap system 20 maintains the air cylinders in proper orientation. Hand truck 10 is primarily controlled by an upper primary handle, generally designated by the reference numeral 22.

Figure 2:
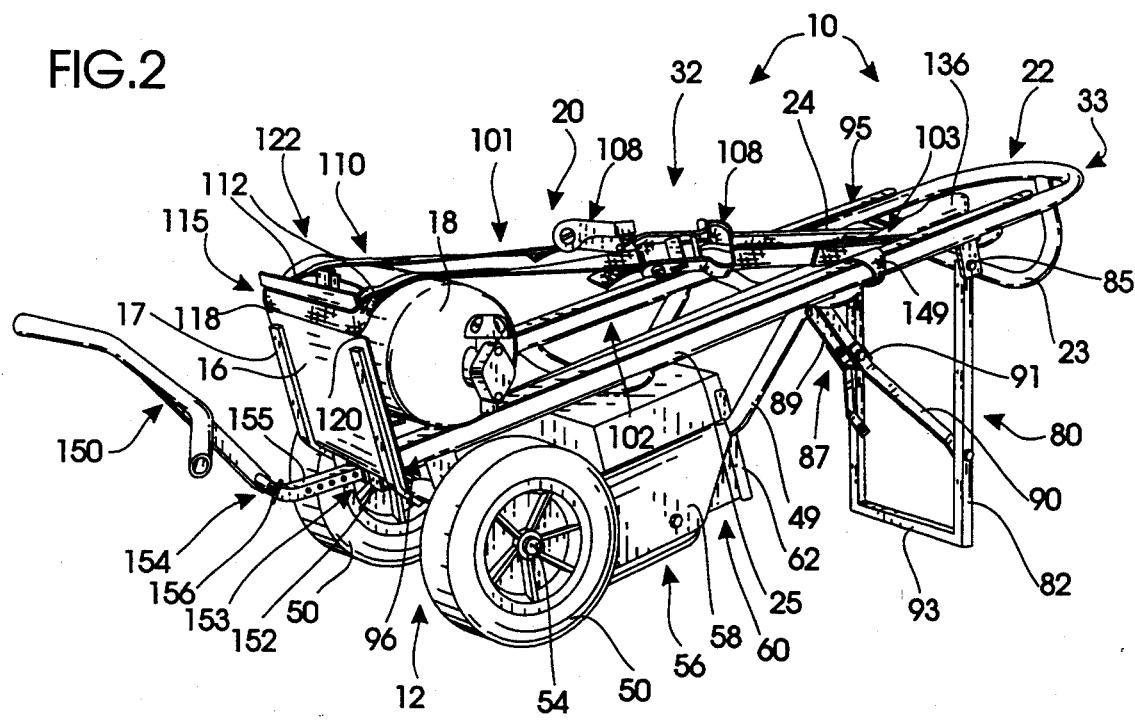
FIG. 2 is an isometric view thereof, showing the retractable support deployed and the auxiliary handle.
Figure 3:
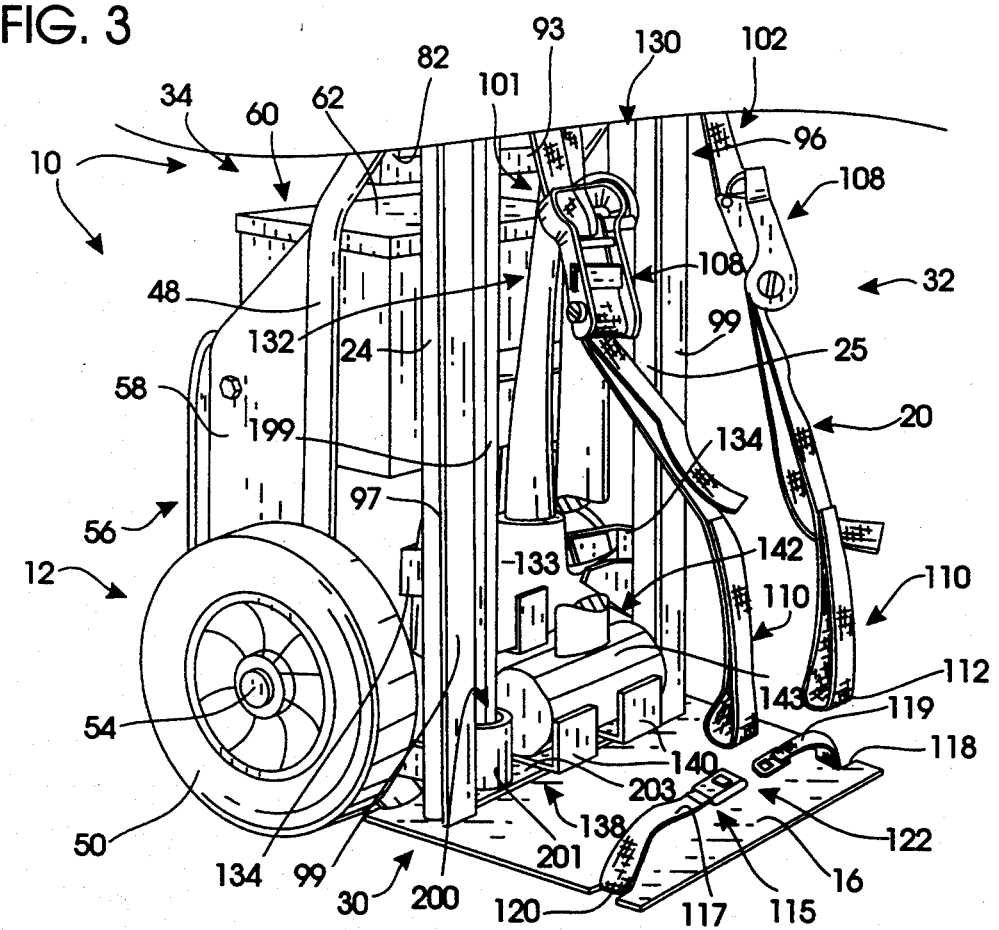
FIG. 3 is an enlarged fragmentary front isometric view thereof, with portions thereof broken away and shown in section for clarity or omitted for brevity, omitting the tank, disconnecting the seat belt but showing its unconnected ends, and showing the support belts loose.

The hand truck 10 comprises a rigid, generally upright frame comprising a pair of integral, rigid spaced apart side rails 24, integrally joined at the top 33 of the truck 10 to form primary handle 22. Handle 22 includes an integral, rearwardly projecting portion 23 that occupies a plane normal to the plane formed by the frame side rails 24 and 25. The rails terminate at the bottom 30 of the apparatus, and they are welded to the rear of a lower toe plate 16. Plate 16 is flat and rigid. Preferably plate 16 is reinforced by a pair of spaced apart braces 17 (FIG. 2). The front of the hand truck has been generally designated by the reference numeral 32. The top of the apparatus has been generally designated by the reference numeral 33. Similarly, the rear of my hand truck has been generally designated by the reference numeral 34.

A plurality of vertically spaced apart, frame reinforcing cross bars 41–43 rigidly extend between rails 24, 25. The frame is entirely comprised of steel tube stock of round cross section. As seen in FIG. 6, cross bar 42, for example, extends between rails 24 and 25 and is of a bent or arched construction. The midportion 45 is thus bowed rearwardly toward rear 34 of the apparatus. Since the cross bars are bowed as described, a storage volume to be described hereinafter is expanded.

In the preferred embodiment the frame also comprises a sub-frame generally designated by the reference numeral 47. Sub frame 47 comprises a pair of rearwardly projecting bent tubes 48, 49 which project from the midpoint of the frame rails 24, 25 and are joined at their bottoms to the bottom of frame rails 24, 25 at toe plate 16. The wheel system 12 includes a pair of conventional spaced apart dolly wheels 50 secured by an axle 54 which extends between the wheels and is transversely rigid with the sub frame tubes 48 and 49.

A conventional stair climbing apparatus 56 is mounted above each wheel 50, secured to the sub frame member 48, or 49 by a flange portion 58. As hand truck 10 is tilted downwardly (i.e., the handle 22 is drawn towards the user, tipping rearwardly away from the viewer in FIG. 1), the conventional stair climbers 56 may conveniently roll upon stairs 57. Also, the stair climbers readily facilitate the rolling or lifting of the hand truck over obstacles such as curbs, fire hoses 59 and the like (FIGS. 7 and 8).

Preferably a generally cubical storage container 60 is affixed between the sub frame tubes 48 and 49. This generally box-like enclosure includes a releasable top 62 that can be relatively easily opened. The storage container is mounted relatively close to the dolly wheels to maintain a low center of gravity. It can store a variety of items such as flash lights, sprinkler wedges, sprinkler tongs, latch straps, hose fittings, adapters, and small hand tools.

Figure 4:
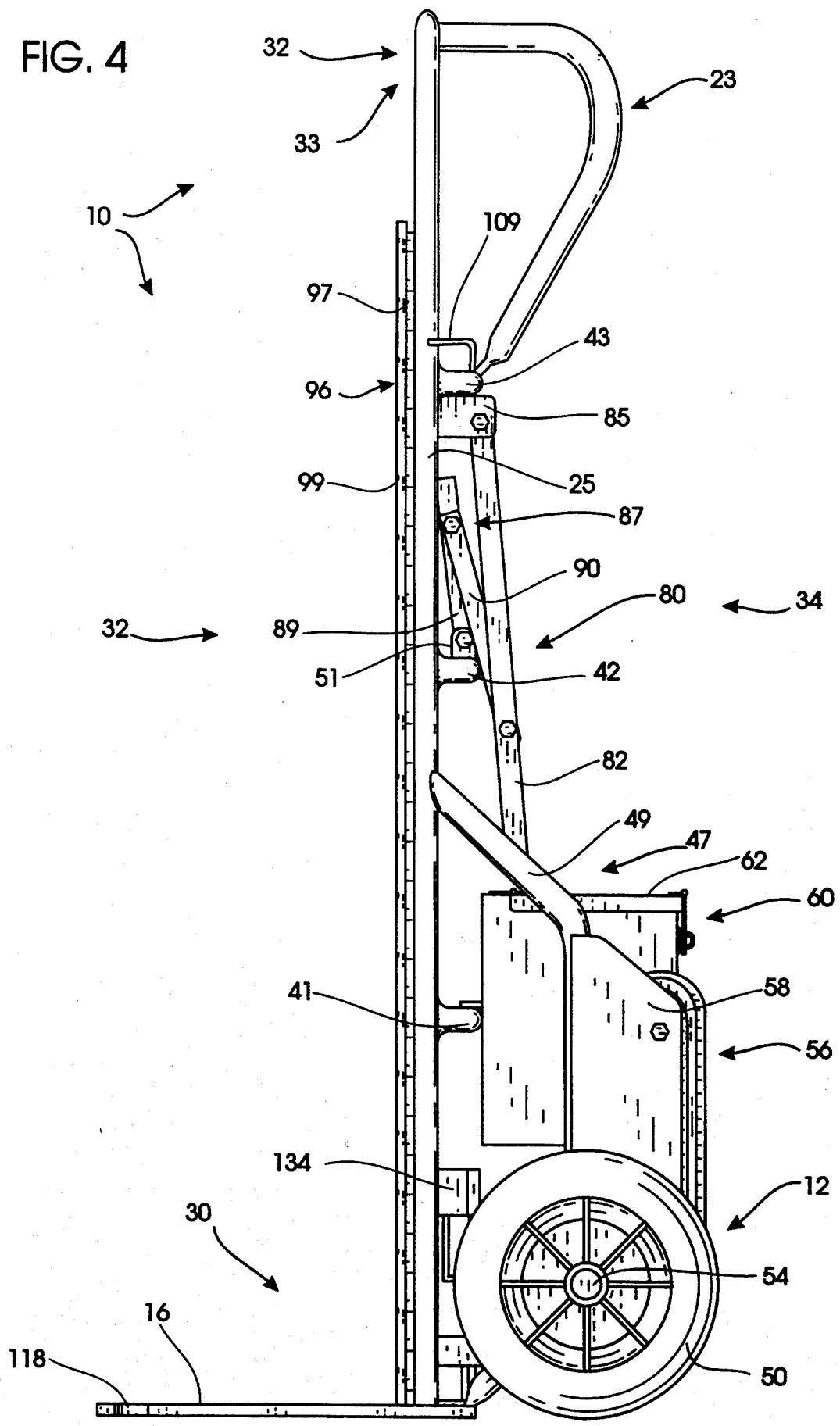
FIG. 4 is an enlarged, fragmentary side elevational view of the hand truck with portions omitted for clarity.

The hand truck can readily assume a generally horizontal orientation for loading and unloading. When deployed in such horizontal orientations, a retractable support system, generally designated by the reference numeral 80, is hand activated. Support 80 comprises a rigid, generally U-shaped leg 82 mounted to the rear of the apparatus between a pair of rearwardly projecting tabs 85. With joint reference to FIGS. 1, 4 and 5, tabs 85 are disposed on opposite sides of the frame, welded to frame rails 24, 25 immediately below the upper cross bar 43. The leg 82 is pivotally linked to a pivoting locking system generally designated by the reference numeral 87. The locking system includes a first arm 89 pivotally secured to an upwardly projecting tab 51 on cross brace 42 and a companion link 90 pivotally secured to the mid-point of the leg 82. A transverse bar 91 extends between the sides of the arm 89. When the leg 82 is deployed, one may push down on bar 91 to lock the device over center. Transverse foot portion 93 of leg 82 will thus contact the ground and stably maintain the hand truck 10 in a generally angular position as illustrated.

Importantly each of the frame rails 24, 25 include elongated runways 95, 96. The runways are disposed on the tops of the rails. Each rail includes a rigid, flat steel portion 97 welded to the rails 24, 25 and an outer resilient rubber liner 99. Liner 99 is frictionally contacted by the air bottles when they are loaded. The liner frictionally secures the bottles, and prevents them from shifting or escaping. When hand truck 10 is disposed in an angular position the bottles are confined within a transportation zone of generally triangular dimensions. The bottom of the zone is formed by the runways 95, 96 upon which the bottles rest. The "base" of the triangular zone is formed by toe plate 16. The strap system 20 forms the hypotenuse of the triangular zone. Strap system 20 is flexible whereas toe plate 16 and runways 95, 96 are substantially rigid.

The preferred strap system 20 comprises a pair of elongated, releasable support straps 101 and 102, only one of which will be described in detail. Both support straps 101, 102 are disposed generally vertically (i.e., when the hand truck 10 is oriented vertically as in FIG. 1), extending from the top of the frame 33 to the bottom of frame 30 or toe plate 16. Each strap 101, 102 comprise an upper looped portion 103 that crosses the upper frame cross member 43 and returns to a tightening ratchet 108. As best seen in FIG. 1, rigid retaining loop 109 maintains the support straps in spaced apart relationship, and thus prevents them from centering on the cross piece 43. The opposite lower end of the strap 110 terminates in a loop 112 at the bottom of the apparatus. The support straps are preferably one inch webbed nylon banding.

When the vertical straps 101, 102 are installed to form the hypotenuse of the securing zone, the conventional ratchets 108 are hand tightened to firmly maintain the air cylinders 18 in position. Importantly, as the hand truck 10 is moved, flexing of the straps 101 and 102 is resisted by a transverse anchor strap, generally designated by the reference numeral 115. When the firefighter reaches his destination, the ratchets 108 can be quickly released to facilitate orderly removal of the SCBA bottles.

Strap system 20 is braced by the anchor strap 115, which nominally is formed from a conventional automobile seat belt and buckle assembly. Anchor strap 115 is preferably mechanically secured to toe plate 16. Toe plate 16 includes a pair of spaced apart notches 118, 120 rigidly defined in its opposite sides. The anchor strap 115 is joined together by a conventional seat belt buckle 122. Strap 115 penetrates loops 112 in each of the support straps 101, 102. Because of the construction disclosed, the loop ends 112 of the support straps 101, 102 flex vertically and horizontally somewhat, limited by the flexing of the anchor strap 115. Buckle 122 can be quickly released, and ends 117, 119 of anchor straps 115 can be separated and withdrawn from loops 112 of the support straps 101, 102. Concurrently, the previously described support will be deployed to stably maintain a generally inclined position (FIGS. 2 and 9).

A recessed storage volume 130 is defined between the runways 95, 96 and the front mid-portions 45 of the cross bars 41, 43. See FIGS. 5 and 6. A plurality of hand tools may be stored within this region. Axe 132 has its head 133 stored within a transverse bracket 134, and the body of the axe lays within the upper portions of volume 130. The axe handle 136 extends upwardly through the apparatus between the rails and the back of the cross bars. A mounting plate 138 is mounted near volume 130 at the bottom 30 of the apparatus upon toe plate 16. It includes a pair of brackets 140 for holding a sledge hammer 142; the hammer head 143 is received directly within the brackets. A pry bar 199 has a point 200 received in a round sleeve 201 welded to plate 203. The VELCRO ™-equipped straps 149 can be fastened to further brace the tools. Thus a plurality of tools can be conveniently mounted within the volume 130.

A secondary handle system has been generally designated by the reference numeral 150. A transverse bracket 152 extends between the frame rails. It includes a receptacle 153 into which the body 155 of the secondary handle may be received. A T-shaped locking handle 154 comprising spring-loaded locking pin 156 may be adjusted to maintain handle 150 at the bottom of the apparatus so that two men may move the device up stairs comfortably.

From the foregoing, it will be seen that this invention is one well adapted to obtain all the ends and objects herein set forth, together with other advantages that are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A portable firefighter's hand truck, said hand truck comprising:
   a rigid, upright, wheeled frame comprising a front, a rear, a top, a bottom, a pair of spaced apart side rails extending generally between said bottom and said top;
   handle means adapted to be grasped by a user for manipulating said hand truck;
   means for storing a plurality of horizontally oriented SCBA air bottles, said last mentioned means comprising:
      a rigid, generally planar, load-bearing toe plate extending between said side rails at the bottom of said frame that projects forwardly outwardly from said frame front, said toe plate comprising a pair of notches;
      a runway disposed on each of said side rails for frictionally contacting said air cylinders and supporting them in cooperation with said toe plate; and,
      an elongated, resilient support strap adjacent each runway extending generally vertically from said frame bottom to said frame top for securing said air bottles; and, a resilient, quick release anchor strap transversely extending between said support straps and entrained between said notches for vertically stabilizing the support straps.

2. The hand truck as defined in claim 1 wherein said quick release strap comprises an automotive seat belt and buckle assembly.

3. The hand truck as defined in claim 1 wherein each of said resilient support straps terminate in lower loops disposed near the frame bottom, and said quick release anchor strap penetrates said loops.

4. The hand truck as defined in claim 1 wherein:
   said frame comprises a plurality of vertically spaced apart, frame-reinforcing cross bars horizontally extending between said side rails at said rear;
   a recessed volume is defined between said runways and said cross bars between said frame rails; and,
   said hand truck comprises means for at least temporarily securing a plurality of hand tools within said recessed volume.

5. The hand truck as defined in claim 1 further comprising a retractable support secured at the rear of said frame for at least temporarily deploying said hand truck in a generally horizontal loading or unloading position.

6. The hand truck as defined in claim 5 wherein said retractable support comprises:
   a rigid leg pivotally secured to said frame and foldable between a nested, retracted position generally parallel with said frame rails and a deployed position projecting generally perpendicularly outwardly from said frame rails; and,
   locking means extending generally diagonally between said leg and said frame when said leg is deployed.

7. The hand truck as defined in claim 5 further comprising a removable secondary handle adapted to be secured to the frame bottom for enabling two-man operation.

8. A portable firefighter's hand truck for storing and transporting a plurality of horizontally oriented SCBA air bottles, said hand truck comprising:

a rigid, upright frame comprising a front, a rear, a top, a bottom, and a pair of spaced apart side rails extending generally between said bottom and said top;

a primary handle formed at said top adapted to be grasped by a user;

a plurality of vertically spaced apart, frame-reinforcing cross bars horizontally extending between said side rails;

a rigid, generally planar, load-bearing toe plate extending between said side rails at the bottom of said frame that projects forwardly outwardly from said frame front;

a runway disposed on each of said side rails for frictionally contacting said air cylinders and supporting them in cooperation with said toe plate;

a elongated, releasable support strap adjacent each runway extending generally vertically upwardly to one of said cross bars for securing said air bottles;

a resilient, quick release anchor strap secured to said toe plate and transversely extending between said support straps for stabilizing them;

a pair of dolly wheels for supporting the hand truck; and, stair climbing means mounted at the rear of said frame for enabling the hand truck to negotiate stairways and other obstacles.

9. The hand truck as defined in claim 8 wherein said toe plate comprises a pair of notches, and said quick release strap is entrained between said notches.

10. The hand truck as defined in claim 9 wherein said quick release strap comprises an automotive seat belt and buckle assembly.

11. The hand truck as defined in claim 9 wherein said resilient support straps terminate in lower loops disposed near the frame bottom and said anchor strap penetrates said loops.

12. The hand truck as defined in claim 9 further comprising a storage container secured to said frame above said dolly wheels and between said stair climbing mechanisms.

13. The hand truck as defined in claim 9 wherein a recessed volume is defined between said runways and said cross bars between said frame rails, and said hand truck comprises means for securing a plurality of hand tools within said recessed volume.

14. The hand truck as defined in claim 9 further comprising a retractable support secured at the rear of said frame for at least temporarily deploying said hand truck in a generally horizontal loading or unloading position.

15. The hand truck as defined in claim 14 wherein said retractable support comprises:

a rigid leg pivotally secured to said frame and foldable between a nested, retracted position generally aligned with said frame rails and a deployed position projecting generally perpendicularly outwardly from said frame rails; and, locking means extending generally diagonally between said leg and said frame when said leg is deployed.

16. The hand truck as defined in claim 9 further comprising a removable secondary handle adapted to be secured to the frame bottom for enabling two-man operation.

17. A portable firefighter's hand truck for storing and transporting a plurality of horizontally oriented SCBA air bottles, said hand truck stable either in a generally vertical standing orientation, a generally horizontal loading or unloading orientation, or a generally inclined transportation orientation, said hand tuck comprising:

a rigid, upright frame comprising a front, a rear, a top, a bottom, and a pair of spaced apart side rails extending generally between said bottom and said top, said frame rails forming a primary handle at frame top, and a plurality of vertically spaced apart cross bars horizontally extending between said side rails;

a rigid subframe projecting rearwardly from said frame, said subframe mounting a pair of dolly wheels to the rear of said frame and a stair climbing mechanism projecting rearwardly of said wheels at the frame rear for enabling the hand truck to negotiate stairways and other obstacles;

a rigid, generally planar, load-bearing toe plate extending between said side rails at the bottom of said frame that projects forwardly outwardly from said frame front, said toe plate comprising a pair of spaced apart notches;

a runway disposed on each of said side rails for frictionally contacting said air cylinders and supporting them in cooperation with said toe plate;

a elongated, releasable support strap adjacent each runway extending generally vertically to one of said cross bars for securing said air bottles, wherein said resilient support straps terminate in lower loops disposed near the frame bottom;

a resilient, quick release anchor strap secured to said toe plate within said notches and transversely extending between said support strap loops; and, a retractable support secured at the rear of said frame for at least temporarily deploying said hand truck in a generally horizontal loading or unloading position.

18. The hand truck as defined in claim 17 wherein said retractable support comprises:

a rigid leg pivotally secured to said frame and foldable between a nested, retracted position generally aligned with said frame rails and a deployed position projecting generally perpendicularly outwardly from said frame rails; and, locking means extending generally diagonally between said leg and said frame when said leg is deployed.

19. The hand truck as defined in claim 18 further comprising a removable secondary handle adapted to be secured to the frame bottom for enabling two-man operation.

* * * * *